United States Patent [19]
Renlund et al.

[11] Patent Number: 5,441,610
[45] Date of Patent: Aug. 15, 1995

[54] OXYGEN SUPPLY AND REMOVAL METHOD AND APPARATUS

[76] Inventors: Gary M. Renlund, 2094 E. Worchester Dr., Salt Lake City, Utah 84121; Mustafa A. Syammach, 1156 E. Browning Ave., Salt Lake City, Utah 84105; Richard R. Mackerell, 8150 S. Stonehill La., Salt Lake City, Utah 84121

[21] Appl. No.: 226,769

[22] Filed: Apr. 12, 1994

Related U.S. Application Data

[63] Continuation-in-part of Ser. No. 843,463, Feb. 28, 1992, Pat. No. 5,302,258, and a continuation-in-part of Ser. No. 112,595, Aug. 26, 1993, Pat. No. 5,385,874.

[51] Int. Cl.[6] .................. C25B 1/02; C25B 9/00; C25B 15/02
[52] U.S. Cl. .................. 204/129; 204/228; 204/229; 204/262; 204/265; 204/266; 204/290 R
[58] Field of Search ............... 204/228, 265, 266, 129, 204/229, 262, 290 R

[56] References Cited

U.S. PATENT DOCUMENTS

| | | | |
|---|---|---|---|
| Re. 28,792 | 4/1976 | Ruka et al. | 204/1 T |
| 3,400,054 | 9/1968 | Ruka et al. | 204/1 |
| 3,640,887 | 2/1972 | Anderson | 252/301.1 |
| 3,887,387 | 6/1975 | Sturhahn | 106/57 |
| 3,914,169 | 10/1975 | Horowitz | 204/195 S |
| 4,151,060 | 4/1979 | Isenberg | 204/195 S |
| 4,205,051 | 5/1980 | Takahashi et al. | 423/266 |
| 4,264,424 | 4/1981 | Niedrach | 204/195 S |
| 4,475,994 | 10/1984 | Gagné et al. | 204/129 |
| 4,477,541 | 10/1984 | Fraioli | 429/33 |
| 4,547,277 | 10/1985 | Lawless | 204/252 |
| 4,547,281 | 10/1985 | Wang et al. | 204/424 |
| 4,599,157 | 7/1986 | Suzuki et al. | 204/192 SP |
| 4,659,435 | 4/1987 | Brothers et al. | 204/1 T |
| 4,725,346 | 2/1988 | Joshi | 204/242 |
| 4,728,584 | 3/1988 | Isenberg | 429/31 |
| 4,851,103 | 7/1989 | Usami et al. | 204/406 |
| 4,877,506 | 10/1989 | Fee et al. | 204/242 |
| 4,879,016 | 11/1989 | Joshi | 204/242 |
| 4,885,142 | 12/1989 | Suitor et al. | 423/219 |
| 4,931,214 | 6/1990 | Worrell et al. | 252/520 |
| 4,957,673 | 9/1990 | Schroeder et al. | 264/60 |
| 4,961,835 | 10/1990 | Kobayashi et al. | 204/427 |
| 4,977,114 | 12/1990 | Horinouchi et al. | 501/104 |

(List continued on next page.)

FOREIGN PATENT DOCUMENTS

| | | | |
|---|---|---|---|
| 90313704.0 | 8/1991 | European Pat. Off. | C25B 1/02 |
| 2649970 | 1/1991 | France | C01G 31/02 |
| 55-136101 | of 1980 | Japan . | |
| 60-2331 | of 1985 | Japan . | |
| 66-77107 | of 1985 | Japan . | |
| 60-77108 | of 1985 | Japan . | |
| PCT/DE87/00343 | 2/1988 | WIPO | A61N 1/20 |
| PCT/US93/02084 | 9/1993 | WIPO | C04B 35/02 |

OTHER PUBLICATIONS

"Oxygen Production Using Solid-State Zirconia Electrolyte Technology"; Jerry W. Suitor and Douglas J. Clark; Jet Propulsion Laboratory, California Institute (List continued on next page.)

*Primary Examiner*—Donald R. Valentine
*Attorney, Agent, or Firm*—Madson & Metcalf

[57] ABSTRACT

The present invention relates to apparatus and methods of supplying and removing oxygen. The apparatus includes an oxygen-conducting solid electrolyte. The electrolyte has an oxygen input side and an oxygen output side which are each coated with an electrically conducting metallic material. When an electrical potential is applied to the electrolyte, oxygen is caused to move from the input side to the output side. A feedback loop is provided to prevent damage to the electrolyte. Depending on the arrangement of electrolyte, the present invention may provide a source of pure oxygen, including high pressure oxygen, or an oxygen free environment.

45 Claims, 4 Drawing Sheets

U.S. PATENT DOCUMENTS

| | | | |
|---|---|---|---|
| 5,006,494 | 4/1991 | Virkar | 501/152 |
| 5,007,992 | 4/1991 | Weber | 204/59 R |
| 5,017,532 | 5/1991 | Sonnenberg et al. | 501/103 |
| 5,021,137 | 6/1991 | Joshi et al. | 204/242 |
| 5,022,975 | 6/1991 | Gordon | 204/277 |
| 5,034,023 | 7/1991 | Thompson | 55/2 |
| 5,035,726 | 7/1991 | Chen et al. | 55/16 |
| 5,037,525 | 8/1991 | Badwal | 204/421 |
| 5,045,169 | 9/1991 | Feduska et al. | 204/258 |
| 5,096,549 | 3/1992 | Yamauchi et al. | 204/228 X |
| 5,160,713 | 11/1992 | Mazanec et al. | 423/210 |
| 5,171,645 | 12/1992 | Khandkar | 429/33 |
| 5,183,801 | 2/1993 | Virkar et al. | 501/152 |
| 5,186,806 | 2/1994 | Clark et al. | 204/265 |
| 5,205,990 | 4/1993 | Lawless | 422/121 |
| 5,290,332 | 3/1994 | Chatterjee et al. | 65/18.1 |
| 5,302,258 | 4/1994 | Renlund et al. | 204/129 |
| 5,332,483 | 7/1994 | Gordon | 204/265 |
| 5,364,506 | 11/1994 | Gür et al. | 204/265 X |

OTHER PUBLICATIONS of Technology, Pasadena, Calif.; Sep. 1990 or thereafter; pp. 127 through 132.

"Dense-Ceramic Oxygen Conducting Membranes"; GRI-90/0303; Apr. 1989 through Sep. 1990; pp. 33 through 35; four pages of references.

"Lattice Parameters, Ionic Conductivities, and Solubility Limits in Fluorite-Structure $MO_2$ Oxide ($M = Hf^{4+}$, $Zr^{4+}$, $Th^{4+}$, $U^{4+}$ Solid Solutions"; Dae-Joon Kim; *Journal of American Ceramic Society*, vol. 72, No. 8, pp. 1415 through 1421, Aug., 1989.

"A Model To Predict The Removal Of Oxygen From Air Using A Zirconia Solid Electrolyte Membrane"; W. J. Marner, J. W. Suitor, and C. R. Glazer; *Proceedings of the 23rd Intersociety Energy Conversion Conference*; vol. 2, ASME, New York, 1988; pp. 265 through 271.

"The Zirconia Oxygen Separation Process"; Jet Propulsion Laboratory, Pasadena, Calif.; May 1987; pp. 2-1 through 2-5.

"Solid Electrolytes With Oxygen Ion Conduction"; E. C. Subbarao and H. S. Maiti; *Solid State Ionics*; 1984; vol. 11, pp. 317 through 338.

"Revised Effective Ionic Radii and Systematic Studies of Interatomic Distances in Halides and Chalcogenides"; R. D. Shannon; *Acta Cryst.*, 751–767 (1976).

OXYGEN SUPPLY AND REMOVAL METHOD AND APPARATUS

RELATED APPLICATION

This application is a continuation-in-part of copending patent application Ser. No. 07/843,463 filed Feb. 28, 1992 and entitled "Compositions, Methods, and Apparatus For Separating Oxygen From A Gaseous Mixture," now U.S. Pat. No. 5,302,258, and a continuation-in-part of copending patent application Ser. No. 08/112,595 filed Aug. 26, 1993 and entitled "Ceramic Compositions for Separating Oxygen from a Gaseous Mixture," now U.S. Pat. No. 5,385,874, both of which are incorporated herein by this reference.

FIELD OF THE INVENTION

The present invention is related to apparatus and methods for supplying pure oxygen or removing oxygen from a gaseous environment. The invention uses doped ceramics which possess particularly high oxygen ion conductivity.

TECHNICAL BACKGROUND

In a number of applications it is important to remove oxygen from a mixture of gases. For example, even in purified gases, it is known that trace quantities of oxygen remain within the gas. In order to provide a very pure gas, it would be desirable to remove as much of the trace oxygen as possible. Examples of such gases include nitrogen and noble gases.

Small quantities of oxygen mixed within otherwise pure inert gases have proven problematic in a number of contexts. For example, in the manufacture of semiconductor devices, it is important to provide an essentially oxygen-free environment during certain types of processing steps. A typical solution for the problem is to flush the processing environment with an inert gas. However, even when inert gas fills the processing environment, trace amounts of oxygen still exist and are mixed with the inert gases.

Various processes have been attempted to remove oxygen from such inert gases. For example, it has been conventional to filter the gas in order to attempt to remove oxygen. Various filtering and removal processes have been employed, including adsorption, absorption, catalytic reactions, and membrane separation. Even using these processes, however, gases of less than ideal purity have been produced. Thus, there is a need in the art to be able to remove oxygen from gaseous mixtures and to obtain an oxygen-free environment.

A reverse of the problem described above is involved in the production of commercial quantities of extremely pure oxygen. Problems similar to those described concerning other gases are also encountered in the production of pure oxygen. In all existing processes, it would be desirable to provide oxygen of better quality using a simple and relatively inexpensive process.

It would also be desirable to provide extremely pure oxygen at high pressure, such as pressures greater than 500 psig. Conventional mechanical compressors used to provide high pressure gases require reciprocating pistons. There are at least three significant disadvantages associated with conventional mechanical compressors: (1) there is a tendency for the compressed gas to become contaminated with oils or lubricants required to overcome the friction between close contact moving parts, along with some metals; (2) there reciprocating motion can cause unacceptable vibration and noise in certain environments, such as hospitals, aerospace, and outer space applications, and (3) the energy required by a conventional compressor is far greater than ion conduction. Thus, there is a need in the art for extremely high pressure oxygen which is obtained without a high energy consuming mechanical action conventional compressor.

The copending patent applications referenced above disclose apparatus and methods which effectively remove oxygen from a gaseous mixture and which are able to provide a source of pure oxygen. Oxygen ion conducting electrolytes made from doped ceramic oxide materials are used in the disclosed apparatus and methods. When relatively pure gases are being processed to remove trace quantities of oxygen, it is possible to reduce the ceramic oxide and cause permanent damage the ceramic.

Accordingly, it would be a significant advancement in the art to provide an apparatus and method for removing oxygen from gaseous mixtures and to obtain an oxygen-free environment which includes a system to prevent damage to ceramic oxide materials used herein. It would also be an advancement in the art to provide pure, high pressure oxygen without the mechanical action of conventional compressors.

Such methods and apparatus are disclosed and claimed herein.

BRIEF SUMMARY OF THE INVENTION

The present invention relates to apparatus and methods of supplying and removing oxygen. The apparatus includes a solid electrolyte containing a ceramic oxide which conducts oxygen. The ceramic oxide contains at least two dopants. Where the ceramic is zirconia or most other conventional ceramics the ratio of the mole percentages of the first dopant to the second dopant is in the range of from about 5.75:10 to about 11:10. When other ceramics are used, it is possible that the ratio of dopants may fall outside this specified range. For example, bismuth oxide behaves somewhat differently and the ratio of dopants may fall outside the specified range.

The electrolyte has an oxygen input side and an oxygen output side which are each coated with an electronically conducting ceramic or metallic material. The coating may be the same or different for each side. Means for creating an electrical potential across the electrolyte, such as a direct current source, is provided. A gaseous mixture containing oxygen is placed in contact with the metal coated input side of the electrolyte such that oxygen passes through the electrolyte to the oxygen output side, but the remainder of the gaseous mixture remains on the metal coated input side of the electrolyte.

The apparatus according to the present invention preferably includes a feedback loop for preventing damage to the ceramic oxide material in the electrolyte. This is preferably achieved by controlling the operating electrical potential across the electrolyte based upon the oxygen partial pressure at the oxygen across the wall of the electrolyte. If the oxygen partial pressure at the oxygen input side is too low, this indicates that the electrical potential is too high and the operating electrical potential is reduced accordingly. Conversely, if the oxygen partial pressure is too great, then the operating electrical potential is increased. The oxygen partial pressure is preferably determined by measuring the electrical potential across the electrolyte and using the Nernst equation to calculate the oxygen partial pressure. For purposes of this calculation, the outside of the tube is assumed to have the oxygen partial pressure of air.

It will be appreciated that the present invention may be used to either collect purified oxygen, or to remove oxygen and water from a mixture of gases and thereby create an oxygen-free environment. It is possible, for example, to remove oxygen which exists in the percent or parts per million range from nitrogen or a noble gas. In order to undertake this process it is only necessary to create an electrical potential between the two sides of a suitable electrolyte by use of a direct current power source at the same time the electrolyte and gases are heated to a desired operating temperature. Then the subject mixture of gases is passed through the electrolyte. Because the electrolyte conducts oxygen ions, oxygen is converted to ions which pass through the walls of the electrolyte and are then recombined. This results in removal of the oxygen from the gaseous mixture and/or the production of pure oxygen.

High pressure oxygen may be obtained according to one embodiment within the scope of the present invention by placing a pressure vessel in gaseous communication with the oxygen output side of the electrolyte. The pressure vessel may be on any of a wide variety of sizes and configurations. It has been found that a relatively small change in electrical potential results in a relatively large increase in the partial pressure of oxygen. The pressure vessel preferably includes a valved exit to control oxygen flow out of the pressure vessel.

The ability to obtain an oxygen free environment is very useful in some highly specialized manufacturing processes, such as the manufacture of semiconductor devices and certain metal-metal plating operations. When an apparatus within the scope of the present invention is placed within a gas-tight compartment and operated to withdraw oxygen from the compartment, all oxygen is removed from the interior of the compartment and from anything placed inside the compartment. In this manner it is possible to remove oxides from objects placed inside the compartment. Such objects may include coins, jewelry, silverware, antiques of other types, and metals which require oxide-free surfaces.

BRIEF DESCRIPTION OF THE DRAWINGS

In order that the manner in which the above-recited and other advantages and objects of the invention are obtained, a more particular description of the invention briefly described above will be rendered by reference to specific embodiments which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
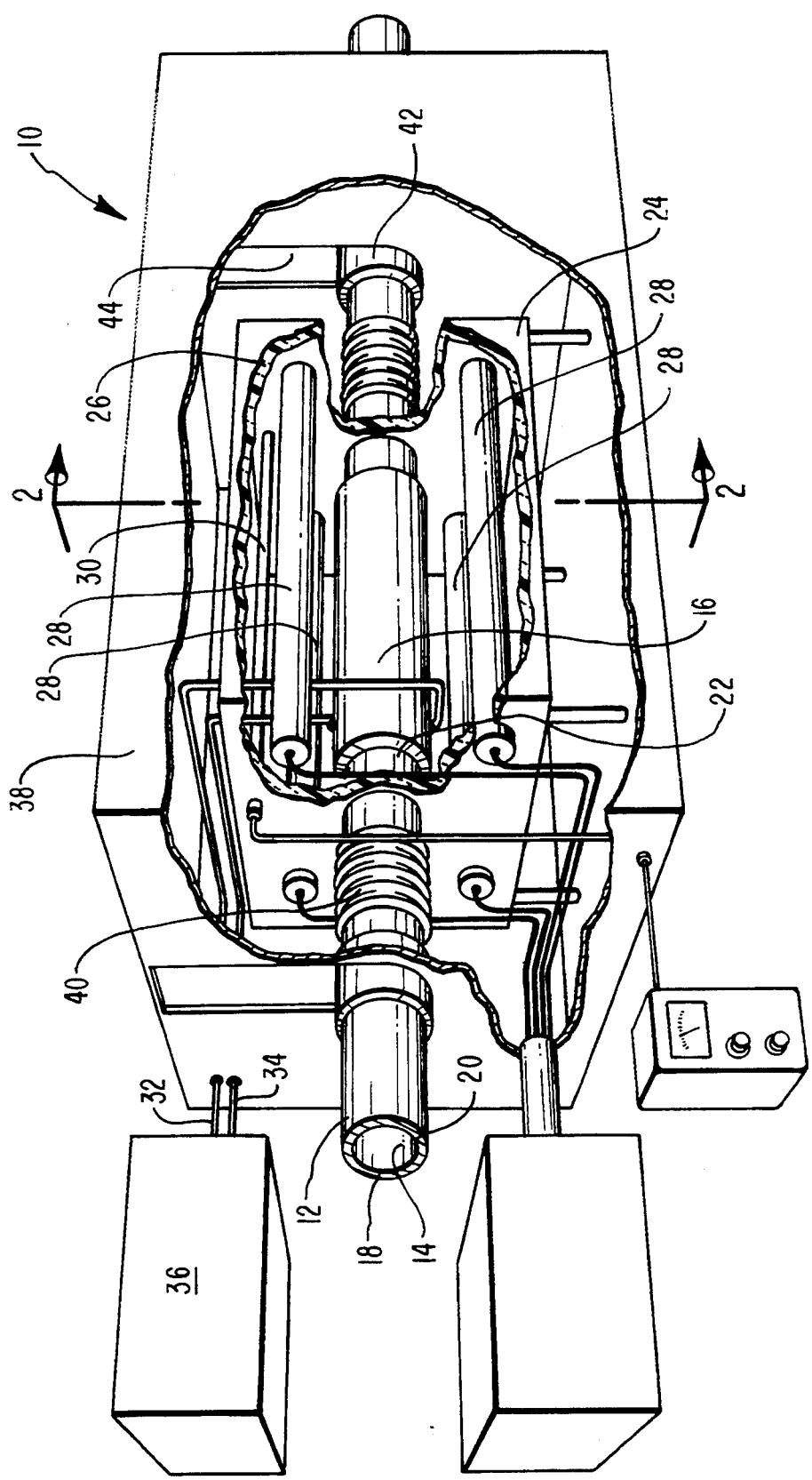
FIG. 1 is a partially cut away perspective view of one embodiment of the device of the present invention.

The present invention relates to apparatus and methods of supplying and removing oxygen. The apparatus includes an oxygen-conducting solid electrolyte. The electrolyte has an oxygen input side and an oxygen output side which are each coated with an electrically conducting metallic material. When an electrical potential is applied to the electrolyte, oxygen is caused to move from the input side to the output side. A feedback loop is provided to prevent damage to the electrolyte. Depending on the arrangement of electrolyte, the present invention may provide a source of pure oxygen, including high pressure oxygen, or an oxygen free environment. The oxygen free environment may also be useful in removing oxides from objects. Typical embodiments of the present invention are described below.

NERNST EQUATION AND OXYGEN TRANSPORT

The mechanism of oxygen ion conduction used in the present invention is theoretically based on the work of Nernst. Nernst found that if there was a difference in oxygen concentration across a dense zirconia membrane, an electrical potential could be measured from electrodes placed on opposite sides of the zirconia. Nernst showed that the following equation relates the applied voltage to the difference in oxygen concentration:

$$E = (RT/ZF) \ln(p2/p1)$$

where: E = electrical potential (volts)
R = gas constant
T = temperature
Z = charge
F = faraday constant
p1 = partial pressure oxygen on side 1
p2 = partial pressure oxygen on side 2

The equation shows that if a potential is applied across the membrane, oxygen ions can be transported from one side of the membrane to the other. The general mechanism of oxygen ion conductivity is believed to be as follows:

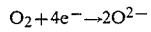

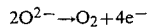

It has been discovered, however, that conventional ceramics, such as zirconia, are inefficient at conducting oxygen ions. Pure zirconia, for example, is not generally incorporated into commercial gas purification devices. In addition zirconia is known to be difficult to handle. This is the case because pure zirconia ceramic experiences a phase transition from a monoclinic to a tetragonal structure at about 1170° C. This results in a large change in volume, which in turn causes stress and cracking in dense ceramic parts.

In order to avoid some of the problems encountered with pure zirconia ceramics, it is conventional to add a dopant to the ceramic. Dopants are found to stabilize the tetragonal zirconia crystal structure. When zirconia is doped to higher levels, the structure can be stabilized in the a cubic phase. These materials are much easier to handle than pure zirconia. Yet, while certain of these materials are found to be conductive to oxygen ions, their conductivity is less than ideal for purposes of gas processing.

OXYGEN CONDUCTING CERAMIC

As described above, the present invention uses ceramics which display surprising levels of oxygen ion conductivity. In particular, the ceramic compositions used in the present invention are formulated such that there exist "point defects" in the crystal lattice. The defects are specifically selected and formed in order to allow maximum oxygen ion conductivity.

The basic materials used in the formulation of the ceramic material of the present invention are ceramic oxides which conduct oxygen ions. Typical basic materials include zirconia ($ZrO_2$), ceria ($CeO_2$), bismuth oxide ($Bi_2O_3$), thoria ($ThO_2$), hafnia ($HfO_2$), and similar materials known in the ceramics art.

It is found that some of the materials which are alternatives to zirconia, such as ceria and bismuth oxide, are efficient at creating conduction of oxygen through the electrolyte. These benefits are somewhat offset, however, with limitations such as lower strength than zirconia, and increased susceptibility to chemical reaction under conditions of low oxygen partial pressure and high voltage and temperature.

Ionic conduction is increased in the present invention by doping the primary material with multiple dopants. Typical dopants include yttria ($Y_2O_3$) and magnesia (MgO), as well as the oxides of calcium, barium, strontium, lanthanum, ytterbium, and scandium, and like elements.

It is believed that dopants increase oxygen conductivity by introducing "defects" within the crystal lattice which allow the passage of oxygen ions.

Optimal oxygen ion conductivity is obtained by careful selection of the dopants and the resulting lattice defects. In particular, it is preferred to select dopants which display ionic radii very near that of the primary material (such as zirconia or ceria). At the same time, it is desirable to chose dopants based on metals which have a different valence than the primary material. That is, in a composition based on zirconium, which has a +4 valence, dopants having +2 and +3 valences are presently preferred. This provides defects in the crystal lattice which allow the passage of ionic oxygen.

In addition, it is important to balance the size of the first and second dopants added. It is preferred that the ionic radius of the ceramic oxide be within a factor 0.75 of the ionic radius of the dopants. For example, the addition of yttria to a zirconia lattice provides a particular set of lattice distortions. By then adding magnesia, the crystal lattice is allowed to return to a more stable state. In this manner, the selection of multiple dopants provides the general benefits of added dopants, but minimizes the limitations otherwise experienced with the use of dopants.

In a representative embodiment, yttria and magnesia are added to zirconia. Typically from about 2.5% to about 25% yttria is added. It is found that when between about 2.5% to about 6% yttria is added a tetragonal crystal lattice is formed. When more than about 6% yttria is added, a cubic crystal lattice is observed. In most embodiments of the present invention, the cubic lattice is preferred in that the cubic form readily allows for the transport of oxygen ions through defects resulting from the addition of the yttria dopant.

Magnesia is then added to the composition. Magnesia provides additional defects in the crystal lattice, but also results in a general balancing of the size of the defects. This results in a marked increase in the conductivity of oxygen ions. The ratio of mole percentages of magnesia to yttria is preferred to be in the range of from about 6.5:10 to about 9.5:10. One preferred composition comprises about 5.61 mole percent magnesia, 7.00 mole percent yttria, and the remainder zirconia. A preferred alternative composition comprises about 5.23 mole percent yttria, about 6.77 mole percent calcium oxide (calcia), and the remainder ceria.

As mentioned above, the total mole percent dopants in the composition will typically be in the range of from about 8% to about 25% of the total ceramic composition. The remainder of the composition will be the ceramic matrix material, such as zirconia or ceria.

In zirconia doped with a single dopant, typical oxygen ion resistivity is in the range of about 100 ohm-centimeters. Using the present invention conversely, oxygen ion resistivity is observed in the range of about 22–32 ohm-centimeter. Thus, it will be appreciated that the present invention provides significantly increased capability to conduct oxygen ions.

OXYGEN SUPPLY OR REMOVAL APPARATUS AND METHOD

As mentioned above, the present invention relates to apparatus and methods of supplying and removing oxygen. The apparatus includes an oxygen-conducting solid electrolyte as described above. A currently preferred apparatus within the scope of the present invention can be best understood by reference to the drawings where like parts are designated with like numerals throughout.

Reference is first made to FIG. 1 in which one embodiment of the apparatus of the present invention is illustrated and designated 10. FIG. 1 is a partially cut away perspective view of a gas processing device within the scope of the present invention. The basic functional feature of the device is the hollow cylinder or tube 12.

As illustrated in FIG. 1, the cylinder 12 may run the length of the device 10. The cylinder 12 is formed of the oxygen-conducting ceramic composition described above. The ceramic structure forms an electrolyte 18. The electrolyte 18 is then coated in order to provide conductive surfaces, or electrodes 14 and 16, on the inside and the outside of the cylinder respectively. The electrode materials may be any acceptable electrically conductive material. Such materials which fall within the scope of the present invention include silver, platinum, and palladium. The material on the inside of the cylinder may be the same or different from the material on the outside of the cylinder. In one embodiment, the material on the outside of the cylinder is silver, whereas the material on the inside of the cylinder is platinum.

The preferred apparatus of the present invention typically includes a hollow cylinder constructed of the ceramic material described above. However, it should be understood that the teachings contained herein could also be used for a planar sheet or a honeycomb configuration.

It may be desirable to provide intermediate layers 20 and 22 between the electrodes and the electrolytes. Such material may include strontium-doped lanthanum manganate (LSM), strontium-doped lanthanum, cobalt, iron (LSCoFe), or similar material. LSM is particularly acceptable because of its combination of properties. LSM provides an adhesive intermediate layer between the electrolyte 18 and the electrodes 14 and 16. At the same time, LSM is electrically conductive and is believed to catalyze the conversion of oxygen to oxygen ions. Thus, LSM may significantly increases the effectiveness of the device. LSCoFe is also found to be acceptable in this context because of its excellent conductivity.

It will be appreciated that the conductivity of oxygen ions is most effective at elevated temperatures. In particular, for most ceramics such as zirconia based ceramics, temperatures in the range of from about 650° C. to about 1000° C. are required to provide efficient conductivity. It is presently preferred, however, to operate at temperatures in the range of from about 780° C to about 820° C. For non-zirconia-based ceramics, those skilled in the art will appreciate that the preferred temperature range may be somewhat different from that specified above.

In order to operate the device 10 at these elevated temperatures it is necessary to isolate the high temperature area from the remainder of the device. In the illustrated embodiment, this takes the form of an enclosure 24 disposed about the electrolyte and related structures. This interior enclosure 24 also preferably includes an adequate layer of insulation 26 to isolate the remainder of the device from the elevated operating temperatures.

Placed within the interior of the enclosure 24 are the necessary components to provide an electrical potential across the electrolyte 18 and to control the temperature within the enclosure 24. Thus, a series of heating elements 28 are provided. These heating elements 28 are available commercially and may take the form of heating coils or other conventional types of heating elements. In order to control the temperature, a temperature sensor or thermocouple 30 is also disposed within the interior of the enclosure 24 and attached to the required external power source and controls. All of these elements are powered and controlled through the use of conventional power sources and control components (not shown).

Also illustrated are wires 32 and 34 which extend into the interior enclosure 24 from the exterior of the device. Wire 32 is attached to the exterior electrode 16 and wire 34 is similarly attached to the interior electrolyte 18. The wires 32 and 34 are in turn connected to a direct current power source 36. In this manner, the necessary electrical potential is created across the electrolyte 18. As described above, the electrical potential is required in order to accommodate the flow of oxygen ions through the electrolyte 18.

Disposed around the interior enclosure 24 is a second exterior enclosure 38. The enclosure 38 covers and protects the essential working components of the device 10. Also illustrated between the interior enclosure 24 and the exterior enclosure 38 are a set of bellows 40. Bellows 40 act as a seal and means for compensating for thermal expansion in the device. By use of the bellows system, it is possible to maintain an essentially cold seal between the electrolyte and the enclosure 38.

FIG. 1 also illustrates one method of suspending the cylinder 12 within the device. That method involves the use of a pair of bulkhead fittings 42 configured such that they support said electrolyte cylinder 12. The bulkhead fittings 42 provide for gentle suspension of the cylinder 12 such that damage and breakage are avoided. In addition, in alternative embodiments of the device it is possible to employ bulkhead fittings 42 in order to suspend multiple cylinders 12 within the device.

Figure 2:
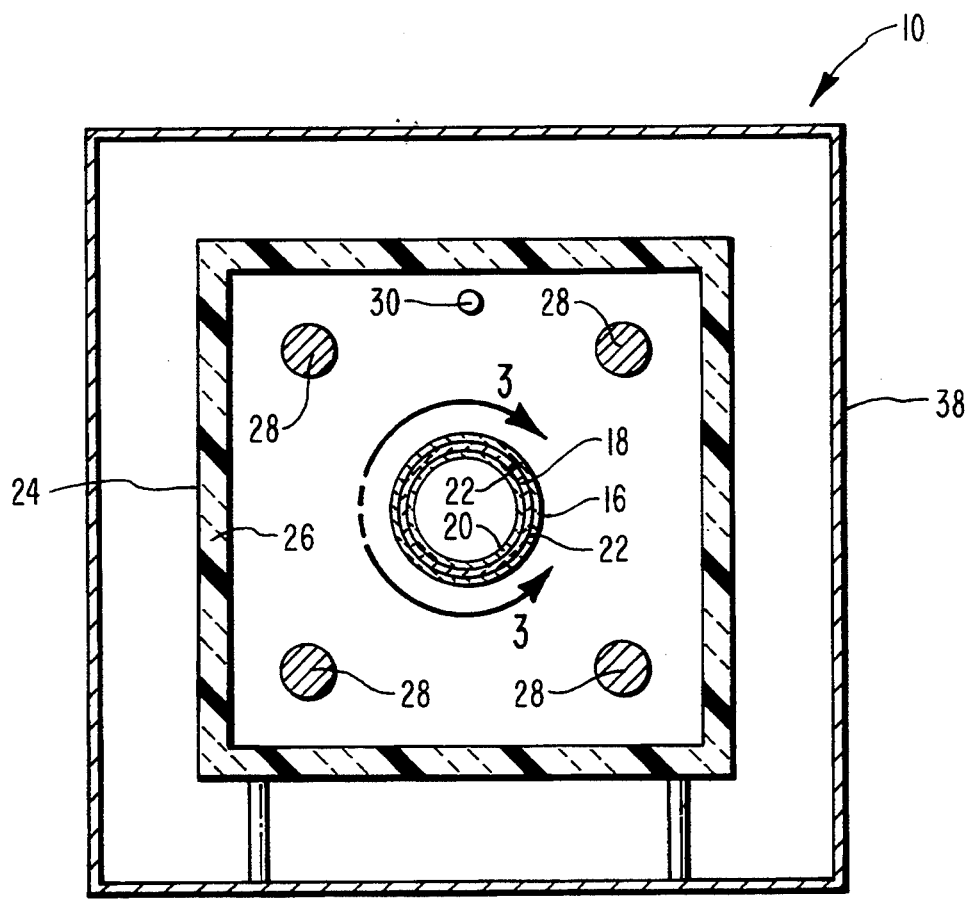
FIG. 2 is a cross-section of the device illustrated in FIG. 1.

FIG. 2 is a cross sectional view of the device 10 illustrated in FIG. 1. In FIG. 2 the same components of the device 10 are illustrated, however, the spacial relationship of the components can be more fully appreciated when FIG. 2 is taken in combination with FIG. 1. In particular, the structure of the cylinder 12 is illustrated. As can be seen in FIG. 2, the basic structural feature of the cylinder is the electrolyte 18. Coated on both the inside and the outside surfaces of the electrolyte 18 are layers of LSM. As mentioned above, the LSM layers provide a number of benefits including improved electrical conductivity of the cylinder, an adhesive layer between the electrolyte and the metallic electrode layers, and a catalyst for the ionization of oxygen.

Coated onto the inside and the outside of the cylinder are metallic electrode layers. As mentioned above, these may preferably comprise silver, platinum, palladium, gold or copper.

FIG. 2 also illustrates the heating mechanism disposed within the interior enclosure 24. The heating mechanism comprises a series of four (4) heating elements 28 and a thermocouple/temperature controller 30. These components provide a simple mechanism for achieving and controlling the required operating temperatures within the device.

The structure of the two enclosures is also illustrated. The interior enclosure houses the high temperature operating region. Thus, the enclosure includes a layer of insulation 26 within the enclosure 14. As was discussed above, the exterior enclosure 38 encloses the primary operating components of the device. Thus, a compact device 10 is provided in which all of the sensitive components are protected and in which the high temperature area is isolated.

Figure 3:
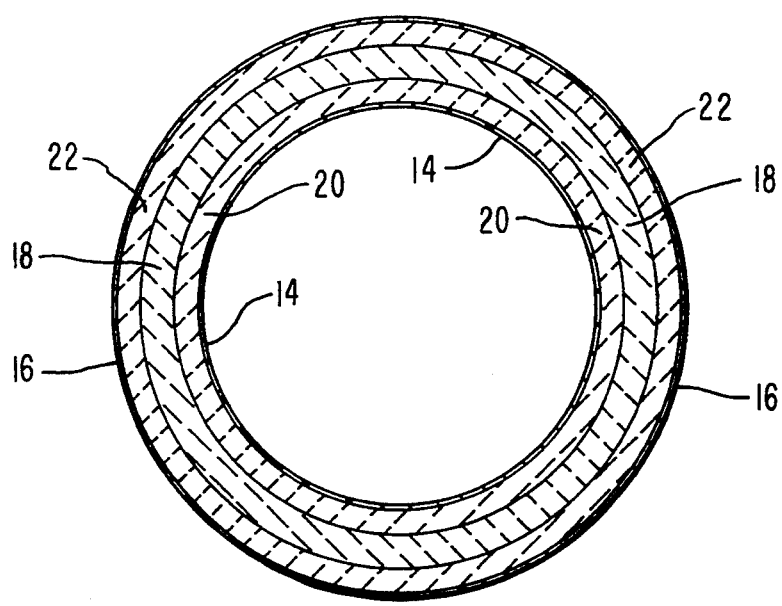
FIG. 3 is a cross-section of a ceramic tube useful in the device illustrated in FIGS. 1 and 2, showing the various layers which make up the tube.

Reference is next made to FIG. 3. FIG. 3 is a cross-sectional view of the cylinder 12 and illustrates the cylinder 12 in some additional detail. The structure of the cylinder 12 is as discussed in detail above. The interior layer of the cylinder comprises a ceramic electrolyte 18. Moving toward the exterior of the cylinder, the next layer is the LSM 20 layer described above. This layer provides an adhesive intermediate layer between the metal electrode and the ceramic electrolyte 18. The ceramic electrolyte 18 comprising the next layer moving toward the exterior.

On the outside of the ceramic electrolyte is an additional LSM layer 22. Finally, an additional metallic electrode layer 16 is provided on the exterior of the cylinder.

The operation of the device is apparent from the description set forth above. Initially the cylinder 12 is connected to a source of mixed gas to be processed. In that manner, the gas is allowed to flow through the interior of the cylinder 12. At the same time an electrical potential is established between the inside and the outside of the cylinder by means of the direct current power source 36. The interior of the enclosure 24 is heated to the desired temperature range. As mentioned above, the preferred range is from about 650° C. to about 1000° C., with a more preferred range being from about 780° C. to about 820° C.

As the gas passes through the device, oxygen is conducted from the interior of the cylinder 12 to the outside of the cylinder 12, while the remainder of the gas remains within the interior of the cylinder. Thus, the gas, less the oxygen travels out of the device 10 and is collected. At the same time, the oxygen may be collected as it passes out of the device through a bleed valve 44. Thus, the present invention provides effective methods and apparatus for removing oxygen from a gaseous mixture.

Traces of water in the gas stream will also be removed. At higher operating voltages, water is dissociated into hydrogen and oxygen. The oxygen produced in this manner is transported out of the gas stream. While the hydrogen produced remains within the gas stream, it is not found to be problematic when it exists in trace quantities in otherwise pure gases.

Working Examples describing the operation of the disclosed apparatus are found U.S. Pat. No. 5,302,258 and in copending application Ser. No. 08/112,595 which are incorporated herein by reference.

FEEDBACK LOOP

The apparatus according to the present invention preferably includes a feedback loop for preventing damage to the ceramic oxide material in the electrolyte. In certain applications, particularly where relatively pure gases are being further processed for the removal of oxygen, it is possible to reduce the ceramic oxide which forms the oxygen conducting electrolyte. This causes the following exemplary reaction:

$$ZrO_2 \rightarrow ZrO_{2-x}$$

When this occurs, it is possible to permanently damage the ceramic oxide. If the ceramic cools and the structure of the ceramic has changed due to the reduction of the ceramic, the ceramic is observed to change color (gradually changes from white to black) and to crack and break.

Figure 4:
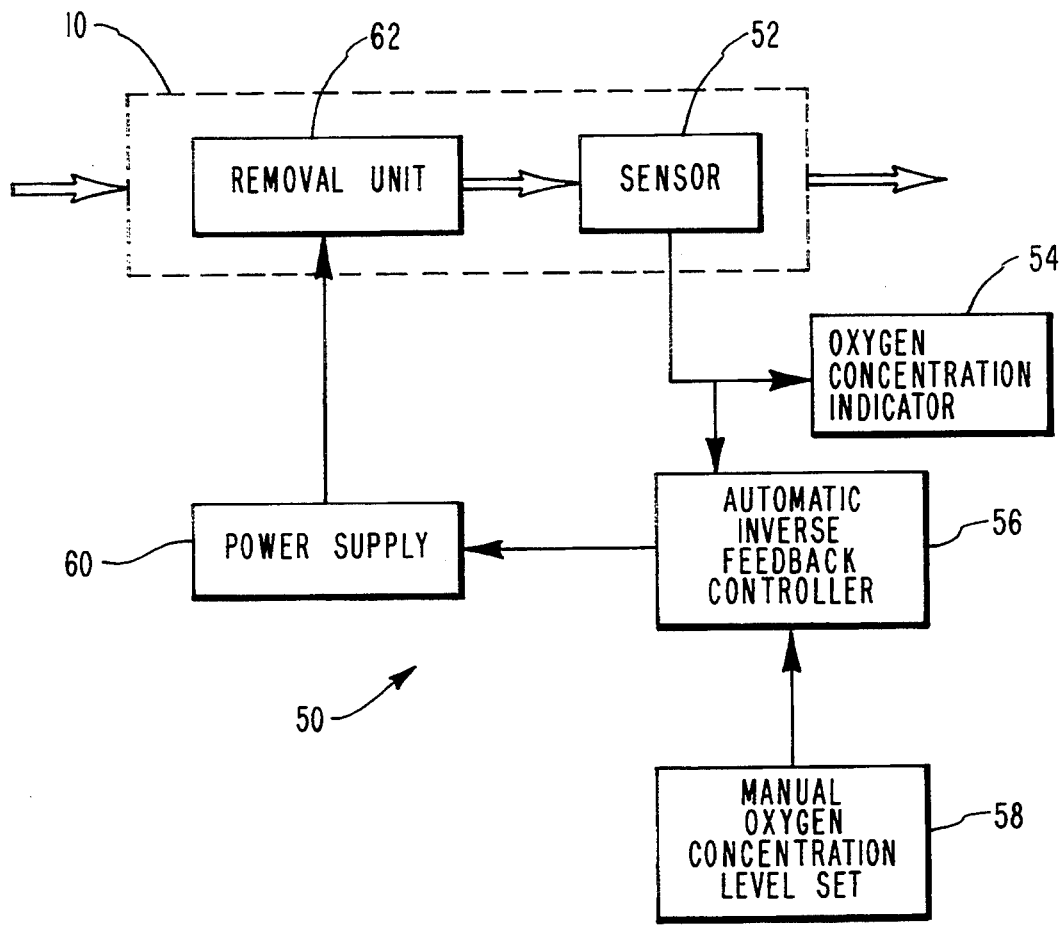
FIG. 4 is a schematic representation of an oxygen output feedback loop.

One possible system for preventing ceramic oxide damage is the feedback loop illustrated schematically in FIG. 4. Feedback loop 50 includes an oxygen sensor 52 for measuring the oxygen partial pressure at the oxygen input side of the electrolyte. The oxygen sensor preferably measures the electrical potential or voltage across the electrolyte and, based upon the Nernst equation, determines the oxygen partial pressure at the outlet end of the electrolyte tube. The oxygen concentration is displayed on an oxygen concentration indicator 54. An automatic inverse feedback controller 56 compares the measured oxygen concentration with a manually set oxygen concentration level 58. The feedback controller 56 then adjusts the power supply 60 (and the operating voltage) to the oxygen removal unit 62. If the measured oxygen partial pressure at the oxygen input side is too low, this indicates that the operating electrical potential is too high and the operating electrical potential is reduced accordingly. Conversely, if the oxygen partial pressure is too high, then the operating electrical potential is increased.

Figure 5:
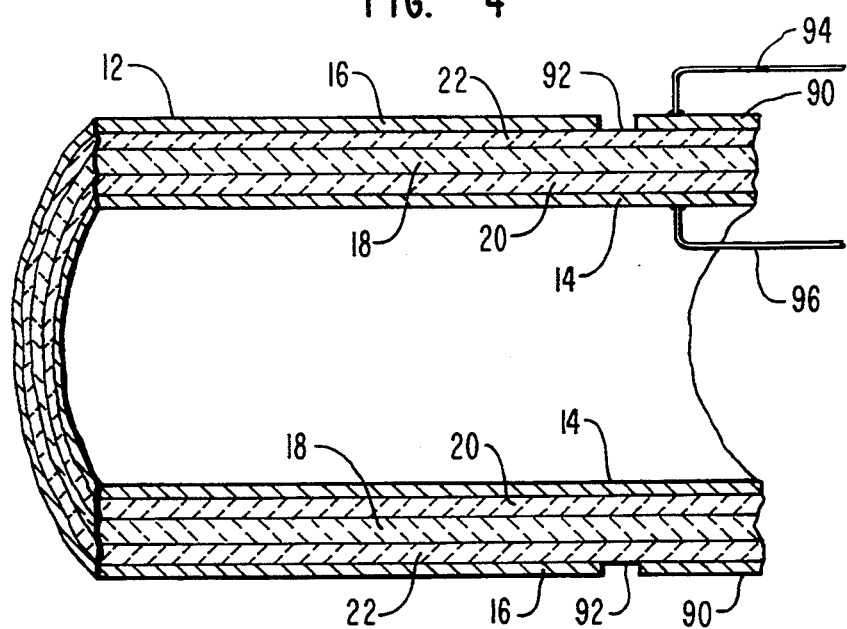
FIG. 5 is a cross-sectional perspective representation of a ceramic tube containing a sensor useful in the feedback loop of FIG. 4.

One possible oxygen sensor is illustrated in FIG. 5. A ceramic electrolyte tube, similar to cylinder 12 illustrated in FIGS. 1–3, is shown. The cylinder 12 includes a ceramic electrolyte 18 sandwiched by LSM layers 20 and 22. Metallic electrode layers 14 and 16 are provided on the interior and exterior surfaces, respectively, of cylinder 12. Because the metallic electrode layers 14 and 16 are connected to a power source (such as power source 36 shown in FIG. 1), it is necessary to electrically insulate a portion of the electrode layer to measure the electrical potential across the electrolyte tube. One manner of electrically insulating a portion of the metallic electrode layer 90, shown in FIG. 5, is to provide a break 92 in the electrode layer. Break 92 may optionally contain an insulating material. With a portion of the electrode layer 90 insulated from the power source, it is possible to measure the potential across the electrolyte tube using wires 94 and 96. Knowing the electrical potential, the oxygen partial pressure within or outside of the tube, depending on the operating conditions, is calculated using the Nernst equation.

It will be appreciated by those skilled in the art that other similar mechanisms may be used to control the electrolyte operating electrical potential and to prevent damage to the electrolyte.

PRESSURIZED OXYGEN

High pressure oxygen may be obtained according an embodiment within the scope of the present invention shown in FIG. 5. Pressurized oxygen generator 70 includes a cylinder 72 similar to that illustrated in FIG. 3, except that One end of the cylinder is closed. The cylinder includes a ceramic electrolyte 18 surrounded by LSM layers 20 and 22. Electrodes are placed on the outer and inner surface of the cylinder. The oxygen generator 70 also includes means for creating an electrical potential across the electrolyte, heating means, sensors, and temperature and electrical controllers, such as those described above, but not shown in FIG. 5. A pressure vessel 74 is in gaseous communication with the oxygen output side of the cylinder 70. The pressure vessel preferably includes an outlet 76 and a valve 78 to control oxygen flow out of the pressure vessel 74.

It has been found that a relatively small change in electrical potential results in a relatively large increase in the partial pressure of oxygen. Table 1, below, illustrates the relationship between a typical oxygen partial pressure and its corresponding electrical potential.

TABLE 1

| Pressure (psi) | Voltage Change (ΔE) |
|---|---|
| 100 | 0.001 |
| 500 | 0.076 |
| 1000 | 0.093 |
| 2000 | 0.109 |

It is possible to provide pressurized pure oxygen for scientific and industrial uses using an oxygen generator within the scope of the present invention. Because the oxygen produced according to the present invention is initially hot, the present invention may be particularly useful in manufacturing processes requiring hot and pure oxygen, such as the manufacture of high temperature superconducting materials.

Those skilled in the art will also appreciate that the oxygen generator within the scope of the present invention provides high pressure oxygen without mechanical action. In some applications it is desirable to eliminate mechanical action and the associated vibration. For example, a vibration-free space-based refrigeration system may be possible according to the present invention.

SURFACE OXIDE REMOVAL

The ability to obtain an oxygen free environment is very useful in some highly specialized manufacturing processes, such as the manufacture of semiconductor devices and certain metal-metal plating operations. When an apparatus within the scope of the present invention is placed within a gas-tight compartment and operated to withdraw oxygen from the compartment, all oxygen is removed from the interior of the compartment and from anything placed inside the compartment. In this manner it is possible to remove oxides from objects placed inside the compartment. Such objects may include coins, jewelry, silverware, antiques of other types, and metals which require oxide-free surfaces.

Figure 6:
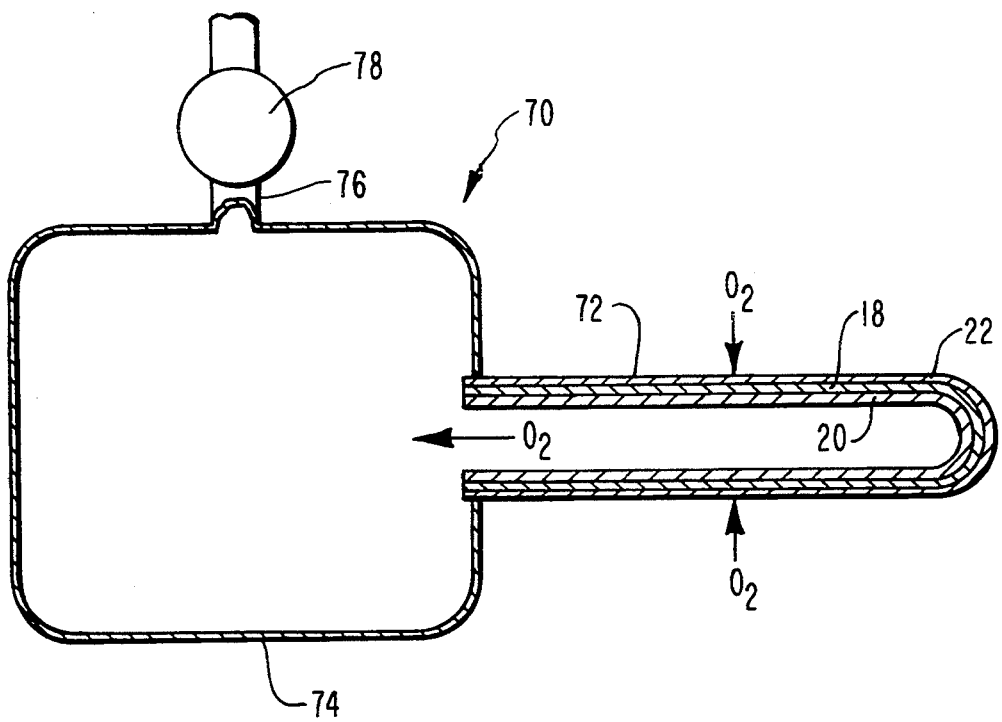
FIG. 6 is a cross-section of an oxygen pressure vessel in gaseous communication with a ceramic tube similar to the one illustrated in FIGS. 1–3.
Figure 7:
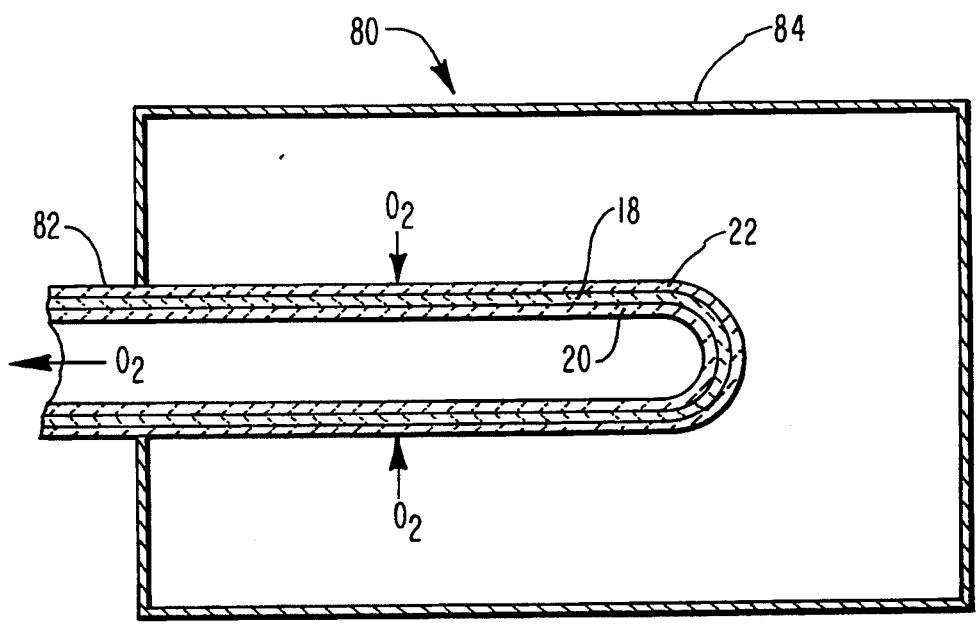
FIG. 7 is a cross-section of a device for removing oxygen from a gas-tight compartment.

An oxygen free environment may be obtained according an embodiment within the scope of the present invention shown in FIG. 6. Oxygen remover 80 includes a cylinder 82 similar to that illustrated in FIG. 3, except that one end of the cylinder is closed. The cylinder includes a ceramic electrolyte 18 surrounded by LSM layers 20 and 22. Electrodes are placed on the outer and inner surface of the cylinder. The oxygen remover 80 also includes means for creating an electrical potential across the electrolyte, heating means, sensors, and temperature and electrical controllers, such as those described above, but not shown in FIG. 6. The oxygen remover may have a configuration similar to the interior enclosure 24 discussed above in connection with FIGS. 1 and 2. When the cylinder 82 is contained within a gas-tight enclosure 84 and operated to withdraw oxygen from the enclosure, oxygen is removed from the interior of the enclosure and from objects placed inside the enclosure as described above. The high operating temperature in combination with the continuous removal of oxygen promotes the removal of oxides from objects inside the enclosure. This represents an useful technique for cleaning and treating tarnished metal surfaces.

SUMMARY

Accordingly, the present invention provides apparatus and methods of supplying and removing oxygen. A feedback loop advantageously prevents damage to the electrolyte. Depending on the arrangement of electrolyte, the present invention may provide a source of pure oxygen, including high pressure oxygen, or an oxygen free environment which is useful in removing oxides from objects.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The claimed invention is:

1. An oxygen supply or removal apparatus comprising:

a solid electrolyte having an oxygen input side and an oxygen output side, said solid electrolyte comprising a ceramic oxide, a first dopant incorporated within said ceramic oxide, a second dopant incorporated within said ceramic oxide;

a first metallic coating applied to the oxygen input side of the electrolyte;

a second metallic coating applied to the oxygen output side of the electrolyte;

means for creating an electrical potential between the oxygen input side and the oxygen output side of the electrolyte;

means for placing a gaseous mixture containing oxygen in contact with the metal coated oxygen input side of the electrolyte such that oxygen contained within the gaseous mixture passes through the electrolyte, but such that the remainder of the gaseous mixture remains on the metal coated oxygen input side of the electrolyte; and a feedback loop having means for controlling the electrical potential between the oxygen input and oxygen output sides of the electrolyte.

2. An oxygen supply or removal apparatus as defined in claim 1, wherein the feedback loop further comprises means for measuring an oxygen partial pressure differential across the electrolyte.

3. An oxygen supply or removal apparatus as defined in claim 1, further comprising a pressure vessel in gaseous communication with the oxygen output side of the electrolyte.

4. An oxygen supply or removal apparatus as defined in claim 1, further comprising a gas-tight compartment in gaseous communication with the oxygen input side of the electrolyte.

5. An oxygen supply or removal apparatus as defined in claim 1, wherein the ceramic oxide comprises zirconia.

6. An oxygen supply or removal apparatus as defined in claim 1, wherein the ceramic oxide is selected from the group consisting of ceria, bismuth trioxide, thoria, and hafnia.

7. An oxygen supply or removal apparatus as defined in claim 1, wherein the first dopant comprises magnesia.

8. An oxygen supply or removal apparatus as defined in claim 1, wherein the first dopant comprises yttria.

9. An oxygen supply or removal apparatus as defined in claim 1, wherein the first dopant is selected from the group consisting of the oxides of calcium, barium, strontium, lanthanum, and ytterbium.

10. An oxygen supply or removal apparatus as defined in claim 1, wherein the second dopant is selected from the group consisting of the oxides of calcium, barium, strontium, lanthanum, and ytterbium.

11. An oxygen supply or removal apparatus as defined in claim 1, wherein the first and second dopants comprise from about 10 mole percent to about 25 mole percent of the solid electrolyte.

12. An oxygen supply or removal apparatus as defined in claim 1, wherein the ratio of the mole percentages of said first dopant to said second dopant is in the range of from about 5.75:10 to about 11:10.

13. An oxygen supply or removal apparatus as defined in claim 1, further comprising an enclosure disposed about the electrolyte.

14. An oxygen supply or removal apparatus as defined in claim 13, further comprising means for heating the interior of the enclosure.

15. An oxygen supply or removal apparatus as defined in claim 14, wherein the means for heating heats the interior of the enclosure to a temperature in the range of from about 650° C. to about 900° C.

16. An oxygen supply or removal apparatus as defined in claim 13, further comprising a second enclosure disposed about the first enclosure.

17. An oxygen supply or removal apparatus as defined in claim 1, wherein the electrolyte is generally a hollow cylinder in shape having a proximal end and a distal end, said oxygen input side comprising the interior surface of said hollow cylinder and said oxygen output side comprising the exterior surface of said hollow cylinder.

18. An oxygen supply or removal apparatus as defined in claim 17, further comprising bellows attached to the proximal end of the electrolyte, said bellows placing the interior of the electrolyte in communication with a gaseous mixture containing oxygen.

19. An oxygen supply or removal apparatus as defined in claim 18, further comprising second bellows attached to the distal end of said electrolyte.

20. An oxygen supply or removal apparatus as defined in claim 17, further comprising two bulkhead fittings configured such that they support said electrolyte.

21. An oxygen supply or removal apparatus as defined in claim 1, wherein the first metallic coating applied to the oxygen input side of the electrolyte is selected from the group consisting of silver, platinum, and palladium.

22. An oxygen supply or removal apparatus as defined in claim 1, wherein the second metallic coating applied to the oxygen output side of the electrolyte is selected from the group consisting of silver, platinum, and palladium.

23. An oxygen supply or removal apparatus as defined in claim 1, further comprising a coating of lanthanum-strontium-manganate disposed over the second metallic coating.

24. An oxygen supply or removal apparatus as defined in claim 1, wherein the means for creating an electrical potential between the oxygen input side and the oxygen output side comprises a direct current power source.

25. An oxygen supply or removal apparatus comprising:
  a solid electrolyte having an oxygen input side and an oxygen output side, said solid electrolyte comprising a ceramic oxide comprising the oxide of a tetravalent element and first and second dopants incorporated within said ceramic oxide wherein said dopants comprise oxides of bi- or tri-valent elements;
  a first metallic coating applied to the oxygen input side of the electrolyte;
  a second metallic coating applied to the oxygen output side of the electrolyte;
  means for creating an electrical potential between the oxygen input side and the oxygen output side of the electrolyte;
  means for placing a gaseous mixture containing oxygen in contact with the metal coated oxygen input side of the electrolyte such that oxygen contained within the gaseous mixture passes through the electrolyte, but such that the remainder of the gaseous mixture remains on the metal coated oxygen input side of the electrolyte; and
  a feedback loop having means for controlling the electrical potential between the oxygen input and oxygen output sides of the electrolyte.

26. An oxygen supply or removal apparatus as defined in claim 25, wherein the feedback loop further comprises means for measuring an oxygen partial pressure differential across the electrolyte.

27. An oxygen supply or removal apparatus as defined in claim 25, further comprising a pressure vessel in gaseous communication with the oxygen output side of the electrolyte.

28. An oxygen supply or removal apparatus as defined in claim 25, further comprising a gas-tight compartment in gaseous communication with the oxygen input side of the electrolyte.

29. An oxygen supply or removal apparatus as defined in claim 25, wherein the ionic radius of the ceramic oxide is within a factor of 0.75 of the ionic radius of the first and second dopants.

30. An oxygen supply or removal apparatus as defined in claim 25, wherein the ceramic oxide comprises zirconia.

31. An oxygen supply or removal apparatus as defined in claim 25, wherein the ceramic oxide comprises ceria.

32. An oxygen supply or removal apparatus as defined in claim 25, wherein the ceramic oxide is selected from the group consisting of bismuth oxide, thoria, and hafnia.

33. An oxygen supply or removal apparatus as defined in claim 25, wherein the first dopant comprises magnesia.

34. An oxygen supply or removal apparatus as defined in claim 25, wherein the second dopant comprises yttria.

35. An oxygen supply or removal apparatus as defined in claim 25, wherein the first and second dopants are selected from the group consisting of the oxides of calcium, barium, strontium, lanthanum, and ytterbium.

36. An oxygen supply or removal apparatus as defined in claim 25, wherein the first and second dopants comprise from about 10 mole percent to about 25 mole percent of the solid electrolyte.

37. An oxygen supply or removal apparatus as defined in claim 25, wherein the ratio of the mole percentages of the first dopant to the second dopant is in the range of from about 5.75:10 to about 11:10 and wherein the first and second dopants comprise from about 10 mole percent to about 25 mole percent of the solid electrolyte.

38. An oxygen supply apparatus comprising:
  a solid electrolyte having an oxygen input side and an oxygen output side, said solid electrolyte comprising a ceramic oxide, a first dopant incorporated within said ceramic oxide, a second dopant incorporated within said ceramic oxide;
  a first metallic coating applied to the oxygen input side of the electrolyte;
  a second metallic coating applied to the oxygen output side of the electrolyte;
  means for creating an electrical potential between the oxygen input side and the oxygen output side of the electrolyte;
  a pressure vessel in gaseous communication with the oxygen output side of the electrolyte; and
  means for placing a gaseous mixture containing oxygen in contact with the metal coated oxygen input side of the electrolyte such that oxygen contained within the gaseous mixture passes through the electrolyte into the pressure vessel, but such that the remainder of the gaseous mixture remains on the metal coated oxygen input side of the electrolyte.

39. An oxygen supply apparatus as defined in claim 38, further comprising a feedback loop comprising means for controlling the electrical potential between the oxygen input and oxygen output sides of the electrolyte and means for measuring an oxygen partial pressure differential across the electrolyte.

40. An oxygen supply apparatus as defined in claim 38, wherein the ratio of the mole percentages of said first dopant to said second dopant is in the range of from about 5.75:10 to about 11:10.

41. An oxygen removal apparatus comprising:
a solid electrolyte having an oxygen input side and an oxygen output side, said solid electrolyte comprising a ceramic oxide, a first dopant incorporated within said ceramic oxide, a second dopant incorporated within said ceramic oxide;
a first metallic coating applied to the oxygen input side of the electrolyte;
a second metallic coating applied to the oxygen output side of the electrolyte;
means for creating an electrical potential between the oxygen input side and the oxygen output side of the electrolyte;
a gas-tight compartment in gaseous communication with the oxygen input side of the electrolyte; and
means for placing a gaseous mixture containing oxygen in contact with the metal coated oxygen input side of the electrolyte such that oxygen contained within the gaseous mixture passes through the electrolyte, but Such that the remainder of the gaseous mixture remains within the gas-tight compartment on the metal coated oxygen input side of the electrolyte.

42. An oxygen removal apparatus as defined in claim 41, further comprising a feedback loop comprising means for controlling the electrical potential between the oxygen input and oxygen output sides of the electrolyte and means for measuring an oxygen partial pressure differential across the electrolyte.

43. An oxygen removal apparatus as defined in claim 41, wherein the ratio of the mole percentages of said first dopant to said second dopant is in the range of from about 5.75:10 to about 11:10.

44. A method of removing oxides from objects comprising the steps of:
(a) placing an object containing surface oxides in a gas-tight compartment in gaseous communication with an oxygen removal device, said oxygen removal device comprising:
a solid electrolyte having an oxygen input side and an oxygen output side, said oxygen input side being in gaseous communication with the gas-tight compartment, said solid electrolyte comprising a ceramic oxide, a first dopant incorporated within said ceramic oxide, a second dopant incorporated within said ceramic oxide;
a first metallic coating applied to the oxygen input side of the electrolyte; and
a second metallic coating applied to the oxygen output side of the electrolyte;
(b) creating an electrical potential between the oxygen input side and the oxygen output side of the electrolyte sufficient to cause oxygen within the gas-tight compartment to pass from the oxygen input side of the electrolyte to the oxygen output side of the electrolyte; and
(c) controlling the electrical potential between the oxygen input and oxygen output sides of the electrolyte to prevent damaging the electrolyte.

45. A method of removing oxides from objects as defined in claim 44, wherein the ratio of the mole percentages of said first dopant to said second dopant is in the range of from about 5.75:10 to about 11:10.

* * * * *